United States Patent
Exner

(10) Patent No.: US 12,212,626 B2
(45) Date of Patent: Jan. 28, 2025

(54) CONTROLLING AN ELECTRONIC DEVICE TO SAMPLE AND TRANSMIT SENSOR DATA

(71) Applicant: SONY GROUP CORPORATION, Tokyo (JP)

(72) Inventor: Peter Exner, Bjärred (SE)

(73) Assignee: SONY GROUP CORPORATION, Tokyo (JP)

( * ) Notice: Subject to any disclaimer, the term of this patent is extended or adjusted under 35 U.S.C. 154(b) by 536 days.

(21) Appl. No.: 17/517,473

(22) Filed: Nov. 2, 2021

(65) Prior Publication Data
US 2022/0201080 A1    Jun. 23, 2022

(30) Foreign Application Priority Data

Dec. 22, 2020    (SE) .................................. 2051537-5

(51) Int. Cl.
*H04L 67/12*    (2022.01)
*H04W 84/18*    (2009.01)

(52) U.S. Cl.
CPC ............. *H04L 67/12* (2013.01); *H04W 84/18* (2013.01)

(58) Field of Classification Search
CPC .. H04L 67/12; H04W 84/18; H04W 52/0261; H04W 52/0258; Y02D 10/00; G06F 1/3234; G06F 1/324; G06F 1/3212; H04Q 2209/43; H04Q 2209/826; H04Q 2209/883; H04Q 9/00
See application file for complete search history.

(56) References Cited

U.S. PATENT DOCUMENTS

| | | |
|---|---|---|
| 9,172,738 B1 | 10/2015 | Dacosta |
| 9,946,571 B1* | 4/2018 | Brown ................ G06F 9/4893 |
| 9,986,503 B1 | 5/2018 | Amorim De Faria Cardote et al. |
| 10,133,989 B1 | 11/2018 | Brown |
| 10,474,213 B1 | 11/2019 | Brown et al. |

(Continued)

FOREIGN PATENT DOCUMENTS

| | | |
|---|---|---|
| CN | 110139235 A * | 8/2019 |
| WO | 2019060819 A1 | 3/2019 |

OTHER PUBLICATIONS

"Office Action with Swedish Search Report", SE Application No. 2051537-5, Jun. 16, 2021, 10 pp.

*Primary Examiner* — Yuwen Pan
*Assistant Examiner* — Fatuma G Sherif
(74) *Attorney, Agent, or Firm* — Myers Bigel, P.A.

(57) ABSTRACT

An electronic device that includes a power source and a wireless transmitter is controlled by a method. The method predicts a magnitude of surplus energy in the power source under the assumption that the electronic device is operated in accordance with a default schedule over a time period. The default schedule defines sampling of sensor data from at least one sensor and transmission of the sensor data by use of the wireless transmitter. The method further determines, based on the magnitude of surplus energy, a modified schedule that results in sampling of an increased amount of sensor data per unit time compared to the default schedule, and configures the electronic device to operate in accordance with the modified schedule for at least part of the time period. The method increases availability of sensor data without compromising the mission of the electronic device.

20 Claims, 5 Drawing Sheets

(56) References Cited

U.S. PATENT DOCUMENTS

| | | |
|---|---|---|
| 2015/0327168 A1 | 11/2015 | Yllasjarvi et al. |
| 2017/0164293 A1 | 6/2017 | Hwang |
| 2017/0188308 A1 | 6/2017 | Nolan et al. |
| 2018/0097401 A1* | 4/2018 | Gaskill ................. H02J 7/0042 |
| 2018/0113498 A1* | 4/2018 | Cronin ................. A61B 5/1118 |
| 2019/0033160 A1* | 1/2019 | Dittberner ............... G01M 3/16 |
| 2020/0326697 A1 | 10/2020 | Somogye et al. |

* cited by examiner

CONTROLLING AN ELECTRONIC DEVICE TO SAMPLE AND TRANSMIT SENSOR DATA

TECHNICAL FIELD

The present disclosure relates to electronic devices that are configured to wirelessly report sensor data and, in particular, techniques for controlling the operation of such electronic devices.

BACKGROUND

Electronic devices for wireless reporting of sensor data are finding more and more use. Examples include various IoT (Internet of Things) devices and wearables for health and exercise tracking, as well as mobile phones, smartphones, tablet computers, etc. Such electronic devices are powered by an on-board power source, for example a battery.

This type of electronic device is foreseen to comprise machine-learning models that evaluate the sensor data for a specific purpose. Alternatively, machine-learning models may be deployed on a computing resource that receives the sensor data from the electronic devices. The development of machine-learning models, as well as maintenance of machine-learning models after deployment, is dependent on the availability of sensor data in situations that are relevant for the purpose of the evaluation. One common approach is to manually collect relevant sensor data. However, it is difficult to foresee all different environments, conditions and usage scenarios that are relevant for real-life use of the electronic device. It is also possible to use sensor data that is reported by deployed electronic devices. However, such electronic devices are typically tailored for a specific purpose and thus sample and transmit sensor data according to one or more default schemes, for example periodically. Thereby, only a fraction, if any, of the reported sensor data may represent environments, conditions and usage scenarios that are relevant for the machine-learning model that is being developed or maintained.

The foregoing is equally applicable to development and maintenance of other types of models, for example statistical models, as well as to statistical analysis.

SUMMARY

It is an objective to at least partly overcome one or more limitations of the prior art.

A further objective is to improve the availability of sensor data from electronic devices for a variability of environments, conditions and usage scenarios.

Another objective is to improve the availability of sensor data while ensuring that the electronic devices sample and transmit sensor data in accordance with their purpose, given by one or more default schedules.

One or more of these objectives, as well as further objectives that may appear from the description below, are at least partly achieved by a method of controlling an electronic device, a computer-readable medium, and a system for controlling an electronic device according to the independent claim, embodiments thereof being defined by the dependent claims.

A first aspect of the present disclosure is a method of controlling an electronic device comprising a power source and a wireless transmitter. The method comprises predicting a magnitude of surplus energy in the power source under the assumption that the electronic device is operated in accordance with a default schedule over a time period, wherein the default schedule defines sampling of sensor data from at least one sensor and transmission of the sensor data by use of the wireless transmitter. The method further comprises determining, based on the magnitude of surplus energy, a modified schedule that results in sampling of an increased amount of sensor data per unit time compared to the default schedule; and configuring the electronic device to operate in accordance with the modified schedule for at least part of the time period A second aspect is a computer-readable medium comprising instructions which, when installed on a processor in an electronic device or in a computing resource which is configured to communicate with the electronic device, causes the processor to perform the method of the first aspect.

A third aspect is a system for controlling an electronic device comprising a power source and a wireless transmitter. The system comprises a first module for predicting a magnitude of surplus energy in the power source under the assumption that the electronic device is operated in accordance with a default schedule over a time period, wherein the default schedule defines sampling of sensor data from at least one sensor and transmission of the sensor data by use of the wireless transmitter. The system further comprises a second module for determining, based on the magnitude of surplus energy, a modified schedule that results in sampling of an increased amount of sensor data per unit time compared to the default schedule; and a third module for configuring the electronic device to operate in accordance with the modified schedule for at least part of the time period.

These aspects provide the technical effect of increasing the availability of sensor data at a computing resource that receives the transmitted sensor data. The technical effect is achieved by detecting and making appropriate use of surplus energy in the power source of the electronic device. The increased availability of sensor data makes it possible to continuously improve performance of evaluation models and/or to develop new evaluation models. For example, a machine learning-based model may be trained or retrained based on the transmitted sensor data. The increased sampling may be tailored to provide sensor data at time points, locations or situations that are particularly relevant to the performance of the evaluation model or when there is a lack of relevant sensor data.

Still other objectives, aspects, and technical effects, as well as features and embodiments will appear from the following detailed description, the attached claims and the drawings.

BRIEF DESCRIPTION OF DRAWINGS

Embodiments will now be described in more detail with reference to the accompanying schematic drawings.

DETAILED DESCRIPTION OF EXAMPLE EMBODIMENTS

Figure 1:
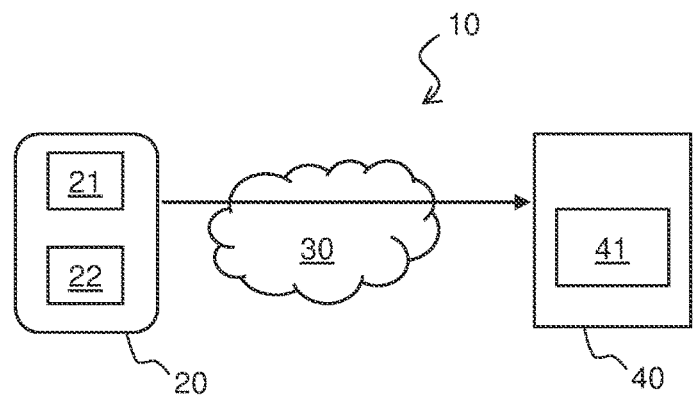
FIG. 1 is a schematic view of an example data collection system comprising an electronic device and a computing resource.

Embodiments will now be described more fully hereinafter with reference to the accompanying drawings, in which some, but not all, embodiments are shown. Indeed, the subject of the present disclosure may be embodied in many different forms and should not be construed as limited to the embodiments set forth herein; rather, these embodiments are provided so that this disclosure may satisfy applicable legal requirements. Like numbers refer to like elements throughout.

Also, it will be understood that, where possible, any of the advantages, features, functions, devices, and/or operational aspects of any of the embodiments described and/or contemplated herein may be included in any of the other embodiments described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more", even though the phrase "one or more" or "at least one" is also used herein. As used herein, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments.

It will furthermore be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing the scope of the present disclosure. As used herein, the term "and/or" includes any and all combinations of one or more of associated listed elements.

Well-known functions or constructions may not be described in detail for brevity and/or clarity. Unless otherwise defined, all terms (including technical and scientific terms) used herein have the same meaning as commonly understood by one of ordinary skill in the art to which this disclosure belongs.

As used herein, "surplus energy" is calculated for a period of time and refers to the difference between available energy in a power source and an expected or predicted energy consumption. The available energy may be given by a measured, estimated or predicted amount of energy in the power source, optionally also taking into account a measured, estimated or predicted addition of energy ("charging") of the power source.

As used herein, "energy consumption" refers to a quantity of electrical energy that is consumed or removed from a power source so as to operate an apparatus or device.

As used herein, "predicting" is used synonymously with forecasting and refers to an estimation about a future outcome or status.

As used herein, a "magnitude" refers to a quantity or amount.

As used herein, a "schedule" defines the operation of an electronic device, at least in terms of the sampling of sensor data by the electronic device and the transmission of sensor data from the electronic device.

As used herein, "default schedule" refers to a schedule that is predefined and assigned to be applied by an electronic device, either at all situations or at one or more predefined situations. An electronic device may thus include a single default schedule, or two or more default schedules which are applied depending on situation. A default schedule may be stored as configuration data in a memory of the electronic device, or be hardcoded.

As used herein, a "mission" of an electronic device denotes the execution of a designated function by the electronic device, corresponding to the purpose of the electronic device, from a starting point to an end point. The end point is typically followed by a charging of the power source in the electronic device. Examples of missions include tracking goods from a starting point to an end point, monitoring the fitness and/or health status of an individual during a nominal time period, for example one or more days, during one or more workouts by the individual, or between time points of leaving and returning to home.

FIG. 1 shows an example of a data collection system 10. An electronic device 20 is configured to measure and transmit sensor data over a network 30 for receipt by a computing resource 40. In the following, the electronic device 20 is also denoted "field device", and the computing resource 40 is also denoted "backend device". The field device 20 is wirelessly connected to the network 30. The network 30 may be of any type and include one or more of a WAN, LAN, PAN, etc. The backend device 40 may be connected to the network 30 by wire or wirelessly and may be any resource capable of processing sensor data received from the field device 20, for example a computer, a server computer, a cluster of computers, a computing cloud, a centralized computing resource, or a distributed computing resource.

In the illustrated example, the field device 20 includes one or more sensors 21 (one shown) and a power source 22 for powering the field device 20. The sensor data that is transmitted by the field device 20 may include raw data from the sensor(s) and/or data that is generated by processing the raw data. It may be noted the respective sensor 21 need not be part of the field device 20 but may be connected thereto, by wire or wirelessly.

The field device 20 may be any type of electronic device configured for wireless communication, such as a mobile phone, a smart phone, a personal digital assistant (PDA), a tablet computer, a laptop computer, an IoT (Internet-of-Things) device, a wearable computer, etc.

Figure 2:
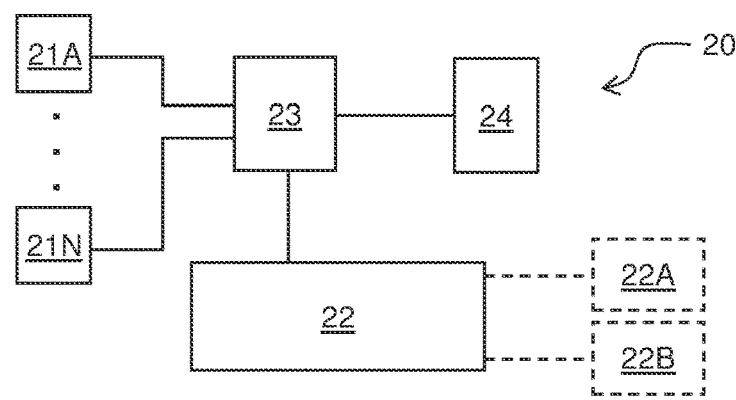
FIG. 2 is a block diagram of an example electronic device.

FIG. 2 is a simplified block diagram of an example field device 20. The field device 20 comprises or is connected to a set of N sensors 21A-21N, with N≥1. The respective sensor 21A-21N may be a converter that measures a physical quantity and converts it into an electrical signal. Such physical quantities may, for example, relate to position, temperature, humidity, speed, acceleration, orientation, or physiological properties of an individual. Corresponding sensors are well-known to the skilled person and will not be listed here. It may be noted that the position may be an absolute position, for example a geographic position given by a GNSS receiver, or a relative position, for example given by inertial navigation using data from one or more accelerometer(s) or an inertial measurement unit (IMU). Further physical quantities and corresponding sensors will be evident from the following disclosure.

The field device 20 comprises an on-board power source 22, for example one or more batteries or a fuel cell, and may also comprises a power interface 22A to receive electrical energy for charging the one or more batteries, or to receive fuel for the fuel cell. A control unit 23 is configured to control the operation of the field device 20, for example based on software instructions executed by one or more processors. A communication arrangement 24 is operable to wirelessly transmit data, and optionally receive data, over the network 30 (FIG. 1). As indicated by connecting lines in FIG. 2, the control unit 23 is connected to the sensor(s) 21A-21N and the communication arrangement 24. The control unit 24 is thereby operable to receive the electrical signal from the respective sensor 21A-21N, generate sensor data based on the electrical signal(s), and operate the communication arrangement 24 to wirelessly transmit the sensor data. The communication arrangement 24 comprises a wireless transmitter, which may include a radio transmitter interoperable with various wireless standard/non-standard/proprietary communication networks such as any cellular network. Alternatively or additionally, the communication arrangement 24 includes a short-range radio transmitter, including but not limited to Bluetooth, BLE, Wi-Fi, or another WLAN based on the IEEE 802.11 standard or its evolution versions. As indicated by dashed lines in FIG. 2, the field device 20 may also comprise an on-board charging device 22B, which is operable to generate electrical energy for charging a battery in the power source 22. For example, the charging device 22B may comprise one or more energy harvesting devices, for example a photovoltaic cell for converting radiation into electrical energy, a vibration powered generator that converts kinetic energy from vibration into electrical energy, or a thermoelectric generator that converts a temperature difference into electrical energy.

In the following description, examples will be given for a field device 20 that is configured to be worn or carried by an individual, exemplified as an activity tracker, and a field device 20 that is configured for tracking of goods during shipment, denoted "logistics tracker" in the following.

An activity tracker is a wearable computer, also known as a fitness tracker or health tracker, for monitoring physical activity and/or status of the wearer, for example in terms of fitness and/or health related metrics such as distance traveled, number of steps, number of repetitions, number of sets, cadence, heart rate, blood pressure, oxygen saturation level, sleep pattern, ECG, etc. These and other metrics may be computed by the activity tracker 20 and/or by the backend device 40. Further, the activity tracker 20 and/or the computing resource 40 may be operable to identify the type of activity, to discriminate between activities performed indoors and outdoors, etc.

A logistics tracker is an electronic device that is configured to be attached to or otherwise combined with goods and enables the location of the goods to be monitored during shipping. A logistics tracker transmits at least its position to the backend device 40 and may measure and transmit further parameters, such as temperature, humidity, pressure, vibrations, etc. The tracker may also output more advanced parameters such as an indication of transportation medium, for example transport by road, air or water. The advanced parameter(s) may be determined by an evaluation model in the tracker. Alternatively, advanced parameters may be determined by the backend device 40 based information from the tracker. The tracker may be assigned a transportation route, including a starting point, a final destination and optionally one or more intermediate location (waypoints). The transportation route is thus at least known to the logistics system in which the tracker is used, and may also be known to the tracker. When a tracker has reached its destination, the tracker does no longer need to report information and will be collected and refurbished for reuse. Although trackers may be required to operate for weeks on a single battery charge, some transportations take much shorter time to deliver goods, for example a day or a week, leaving the trackers with an excess battery capacity at the end of a transportation route.

In the example of FIG. 1, the backend device 40 comprises an analysis module 41 that processes the sensor data from the field device 20, possibly in conjunction with further data received from the field device 20, data received from another electronic device (not shown), or data retrieved from a memory device (not shown). In one example, the analysis module 41 is configured perform a statistical analysis of sensor data from one or more field devices 20. In another example, the analysis module 41 comprises an evaluation model that operates on sensor data, or data derived therefrom, to generate output data related to the use or environment of the field device 20. The evaluation model may be a machine learning-based model, a statistical model, or any other type of mathematical model for prediction, data extraction or data refinement. Such an evaluation model may be trained or otherwise adapted, automatically or manually, based on the incoming sensor data. The training/adaptation may be performed in real time based on incoming sensor data, or offline based on previously collected sensor data. The analysis module 41 need not be located in the backend device 40 that receives the sensor data from the field device 20, and the training/adaptation may be performed in a separate computing resource. In some embodiments, the trained/adapted evaluation model may be executed on the backend device 40, or another computing resource, to generate output data for display or storage. Further, in some embodiments, the trained/adapted evaluation model may be implemented or installed for execution on the field device 20, or on another electronic device of any type.

As explained in the Background section, the development of new evaluation models is hampered by a shortage of sensor data. Shortage of sensor data is also an obstacle to maintenance of existing evaluation models, for example involving training or adaptation of existing evaluation models to new usage situations or usage scenarios, or involving generation of refined or new types of output data. This shortcoming is addressed by embodiments described further below with reference to FIGS. 4-9.

As also discussed in the Background section, a field device 20 is configured for a specific purpose and is provided with one or more default schedules that define how often the field device 20 should sample and transmit the sensor data. In this context, "sampling" of sensor data refers to the generation of data samples of sensor data in the field device 20.

Figure 3A:
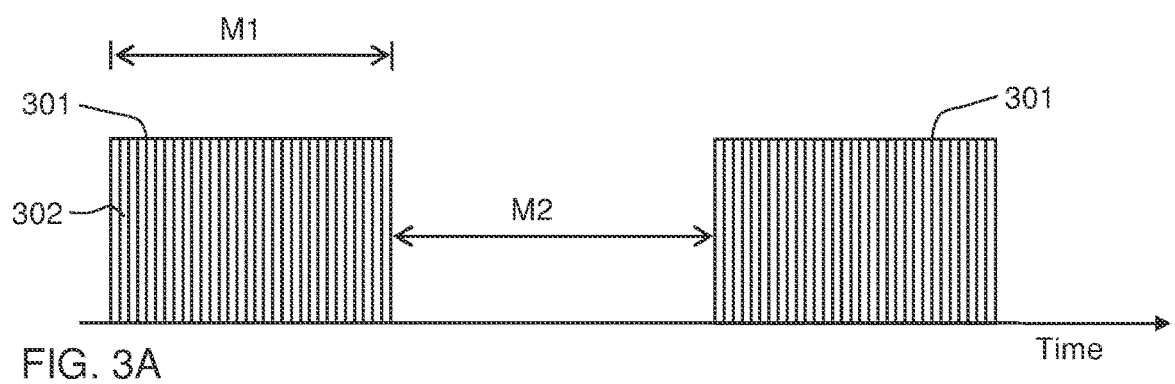
FIG. 3A is a diagram of separated measurement periods with sampling of sensor data, and FIG. 3B are timing diagrams of measurement periods and transmission periods defined by an example schedule for an electronic device.

FIG. 3A shows an example of measurement periods 301 that may be defined by a default schedule in the field device 20. The respective measurement period 301 has a duration M1 and results in a number of data samples 302. The default schedule may define the duration M1 explicitly as a fixed time or implicitly as a fixed number of data samples 302 to be generated during each measurement period 301. The measurement periods 301 are separated by a measurement interval without any sampling of sensor data by the field device 20. In FIG. 3A, the measurement interval has a duration M2, which may be fixed or variable. In one example, the default schedule defines the measurement periods 301 to start periodically.

Figure 3B:
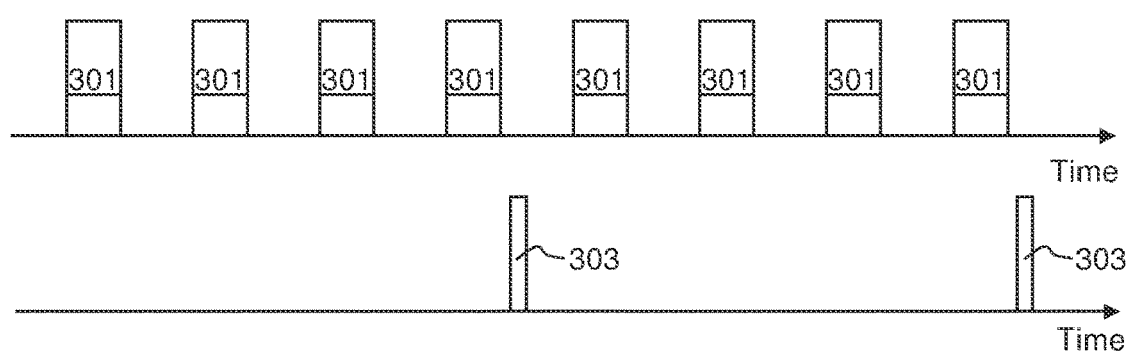

FIG. 3B shows an example of the operation of a field device in accordance with a default schedule, which defines the timing of measurement periods 301 as well as the timing of transmission periods 303, during which sensor data is transmitted by the communication arrangement (24 in FIG. 2). Generally, power consumption is higher for transmission of sensor data than for sampling of sensor data. To reduce power consumption, the default schedule may define the transmission periods 303 to be less frequent than the measurement periods 301, as exemplified in FIG. 3B. It is understood that the field device is configured to buffer the data samples that are generated in-between transmission periods 303, for example in a memory. However, it is conceivable that a transmission period 303 follows upon, or is at least partly concurrent with, each measurement period 301.

The default schedule is adapted to the specific purpose of the field device 20, for example to ensure that sufficient data samples are generated, and that the sensor data is timely transmitted to the backend device 40. The default schedule is also designed with power consumption in mind, to ensure that the field device 20 is capable of completing its intended mission. Thereby, the default schedule is typically designed for a worst-case mission or a nominal mission. In the example of the logistics tracker, the default schedule may be designed for the most distant destination or the scheduled final destination. In the example of an activity monitor, the default schedule may be designed for a nominal time interval at which the user charges the activity monitor and/or for a nominal selection of different types of sensor data to be generated and transmitted.

Embodiments described herein are based on the insight that for many of its missions, a field device 20 has a surplus of energy in the power source 22 in relation the power consumption that is required to carry out the mission. Embodiments are also based on the insight that this opens up the opportunity to use the surplus of energy to increase the sampling of sensor data by the field device 20 during part of the mission, and to transmit the resulting sensor data, so as to increase the availability of sensor data at the backend device 40.

Figure 4:
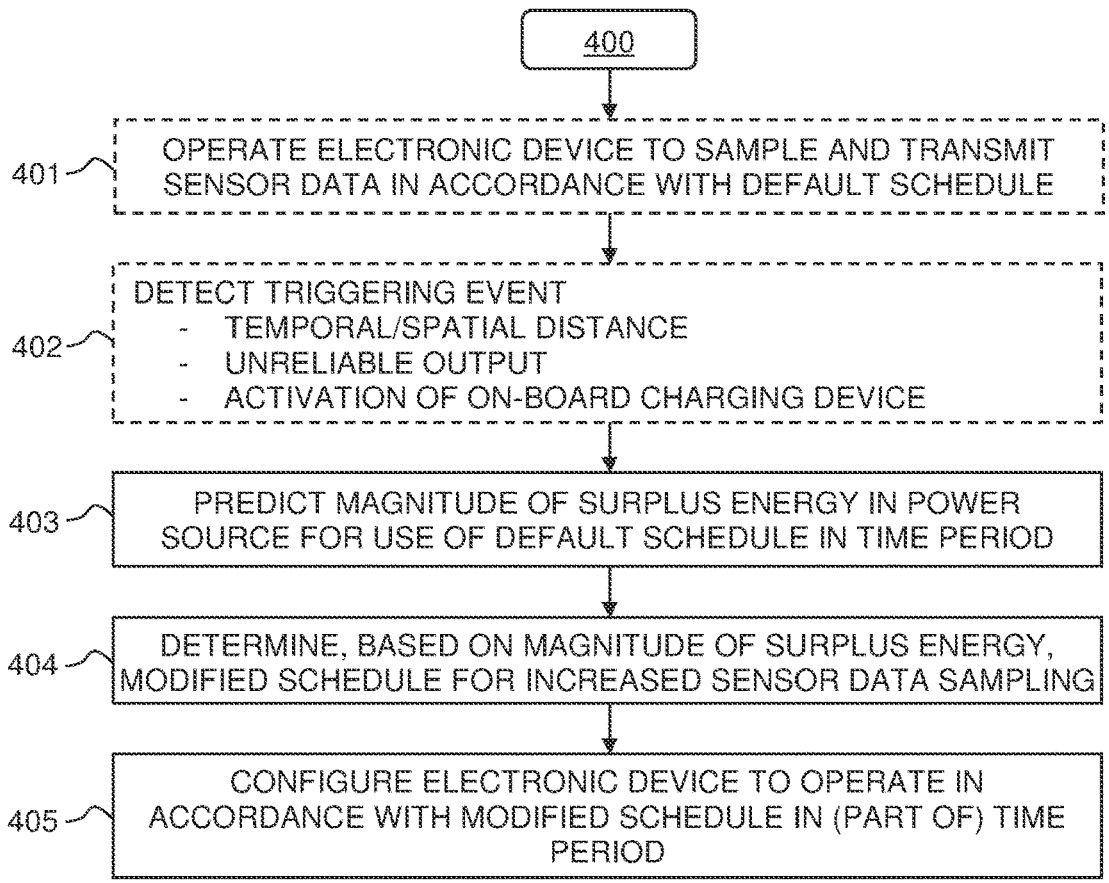
FIG. 4 is a flowchart of an example method of controlling an electronic device.

Embodiments will now be presented with reference to FIG. 4, which is a flowchart of an example method 400 of controlling an electronic device, such as the field device 20 discussed above. As will be explained in more detail below, the method 400 may be performed in the electronic device 20, in the computing resource 40, or distributed between them both. It should be understood that the method 400 may be performed any number of times during a mission of the electronic device 400.

Ignoring optional steps, which are indicated by dashed lines, the method 400 comprises a step 403, which predicts a magnitude of surplus energy in the power source (22 in FIGS. 1-2) under the assumption that the electronic device 20 is operated in accordance with a default schedule over a time period (denoted "evaluation period" in the following). Step 403 may be performed at any selected or arbitrary time point during a mission of the electronic device 20. Also the extent of the evaluation period may be selected or arbitrary. Step 404 determines, based on the magnitude of surplus energy, a modified schedule that results in sampling of an increased amount of sensor data per unit time compared to the default schedule. The amount of sensor data per unit time designates the average number of data samples of sensor data that is generated per unit time by the respective schedule over time. The increased sampling may be achieved in different ways. With reference to FIG. 3A, the sampling rate during a measurement period 301 may be increased, resulting in an increased number of data samples 302 during each measurement period 301. Alternatively or additionally, the duration M1 of the measurement periods 301 may be extended. Alternatively or additionally, the duration M2 of the measurement intervals may be decreased. In step 405, the electronic device 20 is configured to operate in accordance with the modified schedule for at least part of the evaluation period.

The example method 400 has the technical advantage of increasing the availability of sensor data at the backend device 40, by detecting and making use of surplus energy in the power source 22 of the electronic device 20. The increased availability of sensor data makes it possible to continuously improve the performance of an evaluation model in the analysis module 41 and/or to develop new evaluation models. For example, a machine learning-based model may be trained by the sensor data to better recognize environments, activities or usage scenarios, or to recognize new environments, activities or usage scenarios. In one non-limiting example, if the electronic device 20 is a logistics tracker, accelerometer data from the tracker may be used to improve a machine learning-based model for detecting transportation medium in previously unseen environments through continuous retraining. In another non-limiting example, if the electronic device 20 is an activity tracker, radio signal samples detected by the communication arrangement 24 may be processed to detect if the activity tracker is located indoors or outdoors.

Alternatively or additionally, the increased availability of sensor data may be used to improve any statistical analysis performed by the analysis module 41.

In some embodiments, step 404 determines the modified schedule to result in data samples of sensor data in accordance with the default schedule, and additional data samples of sensor data. In other words, the intersection of the data samples resulting from the modified schedule and the data samples resulting from the default schedule is effectively equal to the data samples resulting from the default schedule. This will ensure that the change to the modified schedule has little or no impact on the data samples that would have been received by the backend device 40 if the electronic device 20 were to operate by the default schedule.

In some embodiments, step 404 determines the modified schedule so as to retain a portion of the surplus energy in the power source 22 at the end of the evaluation period. The retained portion forms a safety margin to account for uncertainties in the magnitude of surplus energy predicted by step 403 and in the energy consumption of the modified schedule during the evaluation period. This will ensure operability of the electronic device throughout its mission. The safety margin may, for example, be set to retain 5%, 10% or 20% of the surplus energy. It may be noted that the safety margin may differ for the same electronic device, for example between different types of usage scenarios or between different trigger events (step 402, below).

In some embodiments, step 403 comprises determining an estimated energy consumption for the evaluation period, under the assumption that the electronic device 20 is operated in accordance with the default schedule, determining an amount of energy in the power source 22 at a selected time point in the evaluation period ("available amount"), and evaluating the estimated energy consumption in relation to the available amount to predict the magnitude of surplus energy in the power source. The estimated energy consumption may be calculated as a function of a predefined value of the specific energy consumption, which is the energy consumption per unit time, or based on measurement data. The measurement data may comprise a measured energy decrease in the power source while the electronic device is operated in accordance with the default schedule. The available amount at the selected time point may be determined by measuring the actual energy content in the power source, for example if the selected time point is close to a current time point when step 403 is performed. Alternatively, the available amount may be predicted by use of a model of the energy consumption, optionally in combination with a measurement of a current energy content in the power source. The available amount may also account for an expected recharging of the power source 22, via the power interface 22A and/or by the on-board charging device 22B. The magnitude of surplus energy may be given by the difference between the available amount and the estimated energy consumption, optionally while applying one or more correction factors, for example to account for the selected time point, which may be any time point during the evaluation period. In some embodiments, the selected time point coincides with the start of the evaluation period.

In some embodiments, step 403 may be performed by a machine learning-based model which has been trained to predict the magnitude of surplus energy based on one or more operating parameters of the electronic device 20.

As indicated by step 401 in FIG. 4, the method 400 may perform steps 403-405 while the electronic device 20 carries out its mission and is operated in accordance with the default schedule.

In some embodiments, the method 400 may comprise a step 402 that detects at least one event ("triggering event") based at least partly on the sensor data generated by the electronic device 20, for example when it is operated in accordance with the default scheme (step 401). The detection of the triggering event may cause the method to perform step 403, and subsequent steps 404-405.

In one example, the triggering event may indicate that the power source 22 will or is likely to be recharged by the on-board charging device 22B. For example, a triggering event may be detected when the electronic device is found to be subjected to vibrations or sunlight that will activate an energy harvesting device in the charging device 22B. Vibrations may be detected based on a sensor signal from an accelerometer or vibration sensor in the electronic device, and sunlight may be detected by a sensor signal generated by a light sensor or a temperature sensor in the electronic device. Alternatively or additionally, presence of vibrations may be inferred based on the position of the electronic device, for example by mapping its position onto a geographic map to detect if the electronic device is approaching a bumpy road section, open water, etc. Correspondingly, presence of sunlight may be inferred from information about the weather at the position of the electronic device, and possibly the typography and the location of the sun. In another example, presence of sunlight may be inferred by comparing the current time to time points of sunrise and sunset, optionally while considering the position of the electronic device.

In another example, the triggering event may indicate that the power source 22 will or is likely to be recharged via the power interface 22A or taken out of service. For example, a triggering event may be detected when the electronic device 20 is deemed to approach a known location with recharging capability, for example the home or office of a user, or a waypoint along a transportation route for shipment of goods. This may be detected based on the position of the electronic device and/or the current time. Further, a triggering event may be detected when the power interface 22A is connected for recharging. Still further, a triggering event may be detected when the electronic device 20 is deemed to approach a known location where the electronic device is taken out of service, for example an end point of a transportation route. In yet another example, the triggering event may be detected based on charging history of the electronic device. The charging history may designate a likelihood that the electronic device is charged via the power interface 22A for different positions and/or at different time points.

In another example, the triggering event may indicate that more sensor data is needed. For example, a triggering event may be detected if an evaluation model that analyzes the sensor data, in the computing resource 40 or the electronic device 20, indicates a low confidence of the analysis, for example that the output from a processing of the sensor data is unreliable. For example, if the activity of the wearer of an activity tracker is detected with low confidence, a triggering event may be generated. Similarly, if a prediction of transportation medium (truck/train/ship) for a logistics tracker generates uncertain results, a triggering event may be detected.

As understood from the foregoing, a triggering event may be detected by evaluating the sensor data that is generated by the electronic device. As also understood from the foregoing and indicated in FIG. 4, a detection of a triggering event may comprise a detection that the electronic device 20 is within a predefined spatial or temporal distance from a target location, a detection of unreliable output from a processing of the sensor data, or a detection or prediction of an activation of an on-board device 22B for charging the power source 22.

The use of triggering events makes it possible to tailor the increase in sampling to specific situations and thereby improve the availability of sensor data at these situations. The use of events also makes it possible to tailor step 403 and/or step 404 to these situations, for example by associating different events or types of events with different algorithms for calculating the magnitude of surplus energy by step 403, different evaluation periods for use by step 403, different increases in sampling to be applied by step 404, etc. It is to be understood that different triggering events may be used for different types of electronic devices, for example logistics trackers and activity trackers.

Figures 5A, 5B:
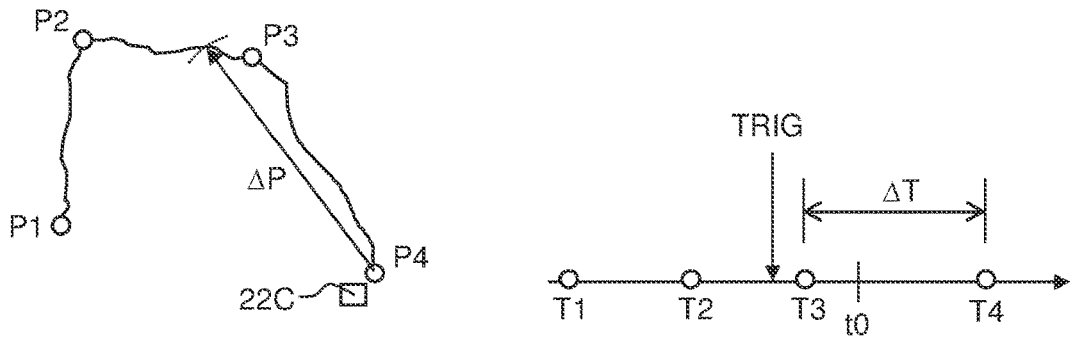
FIG. 5A is a plan view of a movement pattern of an electronic device from a starting point to an end point.
FIG. 5B is a timing diagram with time points corresponding to the movement pattern in FIG. 5A.

To further explain the use of triggering events, reference is made to FIGS. 5A-5B. FIG. 5A shows a route taken by an electronic device on a mission extending from a starting point P1 via two intermediate locations P2, P3 to an end point P4, where the end point P4 comprises or is associated with a charging device 22C for connection to the power interface of the electronic device (cf. 22A in FIG. 2). In the example of a logistics tracker, P1 may be a warehouse, P2 and P3 may be waypoints (for example, drop-off/pick-up locations) along the route, and P4 may be a final destination.

In the example of an activity tracker, P1 may be the office of the wearer, P2 may be a gym, P3 may be a shop and P4 may be the home of the wearer. FIG. 5A indicates that a triggering event may be detected when the electronic device is within a spatial distance ΔP from the end point P4, given as linear distance (as shown) or along a predicted route. In an alternative, not shown, the triggering event may be detected when the remaining time to the end point P4 is less than a temporal threshold. The remaining time may be determined by taking into account the actual traffic situation along the route to the end point P4. FIG. 5B is a timing diagram corresponding to the route in FIG. 5A, with T1-T3 being the departure times at P1-P3, T4 being the time of arrival at P4, and TRIG indicating the detection of the triggering event. In FIG. 5B, ΔT indicates the duration of the evaluation period that is used by step 403 to predict the magnitude of surplus energy. As seen, the evaluation period need not, but may, follow directly upon detection of the triggering event. FIG. 5B also indicates the selected time point t0 that may be applied in the determination by step 403. It should be noted that one or more of the timing of the evaluation period in relation to the triggering event (TRIG), the duration ΔT of the evaluation period, or the timing of the starting point t0 in relation to the evaluation period may be specific to and given by the triggering event.

In some embodiments, the evaluation period is set so as to end when the electronic device 20 arrives at a predefined location. The predefined location may be any of the intermediate locations (cf. P2, P3) or the end point P4, and the predefined location may comprise or be associated with a charging device (cf. 22C in FIG. 5A). As noted above, the method 400 may be performed more than once during a mission. In one example, the method 400 is performed for consecutive evaluation periods during a mission, to determine a respective modified schedule for each evaluation period. On the route of FIG. 5A, the method 400 may be performed upon arrival at P2 and P3 to determine a respective modified schedule for evaluation periods between P2 and P3, and between P3 and P4, respectively. In another example, the method 400 may switch from a modified schedule to another modified schedule or to a default schedule during an evaluation period. On the route of FIG. 5A, the method 400 may be performed upon arrival at P2 to determine and switch to a modified schedule for an evaluation period that extends from P2 to P4. Further down the route, for example upon arrival at P3, the method 400 may again be performed to determine and switch to a new modified schedule or switch to a default schedule.

For a logistics tracker, it may be advantageous for the evaluation period to include the so-called last leg of transportation (also known as "last mile"), which is the last stretch of the transportation route that leads up to the final destination. By the method 400, the tracker can safely increase the sampling and use up at least some of the excess capacity of the power source. By increasing the sampling, previously unseen events can be observed during the last leg while still leaving a safe level of energy capacity in the power source to complete the transportation. Given that goods may be transported to many cities and villages, and to many locations within such cities and villages, sensor data sampled at increased rate will be collected with good overall geographic coverage. Similar advantages may be achieved for an activity tracker. For an activity tracker, the last leg may correspond to the wearer approaching statistically known recharging locations and timepoints, for example "heading home in the evening". By the method 400, the activity tracker may increase the sampling during the last leg, for example 10 minutes before entering home, to improve data collection and an evaluation model in the computing resource 40. For example, the evaluation model may operate on the above-mentioned radio signal samples to detect if the activity tracker is located indoors or outdoors.

Figure 6:
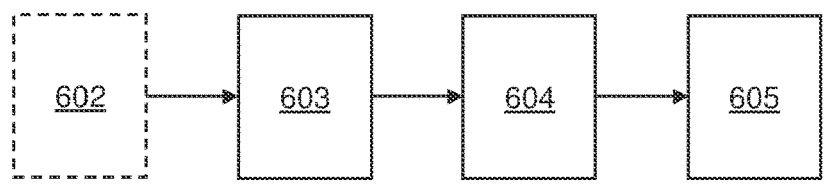
FIG. 6 is a block diagram of a system for performing the method in FIG. 4.

FIG. 6 depicts a system for performing the method 400 as shown in FIG. 4 and described hereinabove. The system comprises modules 602-605 which correspond to and implement steps 402-405. Module 602, which is optional, performs step 402 and provides an indication of a detected triggering event to module 603. Module 603 performs step 403 and provides an indication of the predicted magnitude of surplus energy to module 604. Module 604 performs step 404 and provides an indication of the modified schedule to module 605. Module 605 performs step 405 and configures the electronic device to operate in accordance with the modified schedule.

It should be understood that FIG. 6 depicts an example implementation and that, in other implementations, one or more of the modules 602-605 may be combined into a larger module or separated into smaller modules. The respective module 602-605 may be at least partly implemented by software instructions executed on a processor.

Figure 7A:
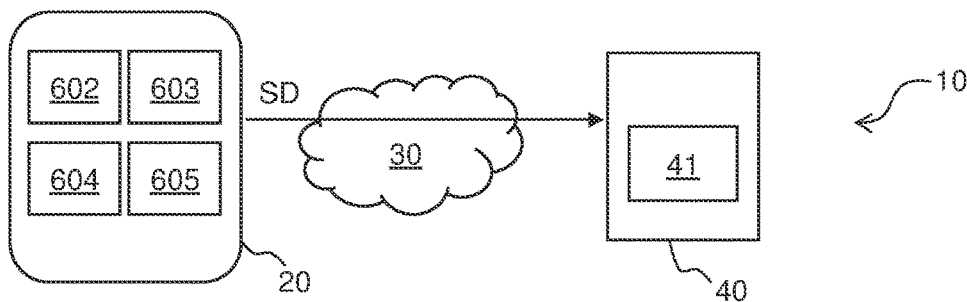
FIGS. 7A-7C are schematic views of example data collection systems with different partitioning of the system in FIG. 6 between an electronic device and a computing resource.
Figure 7B:
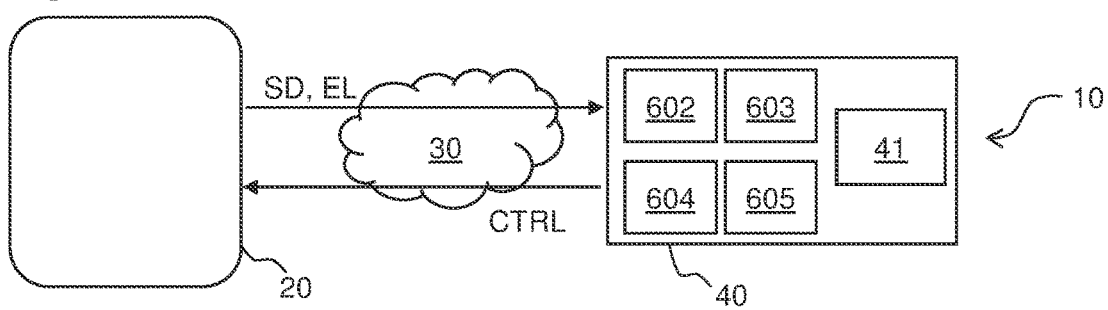
Figure 7C:
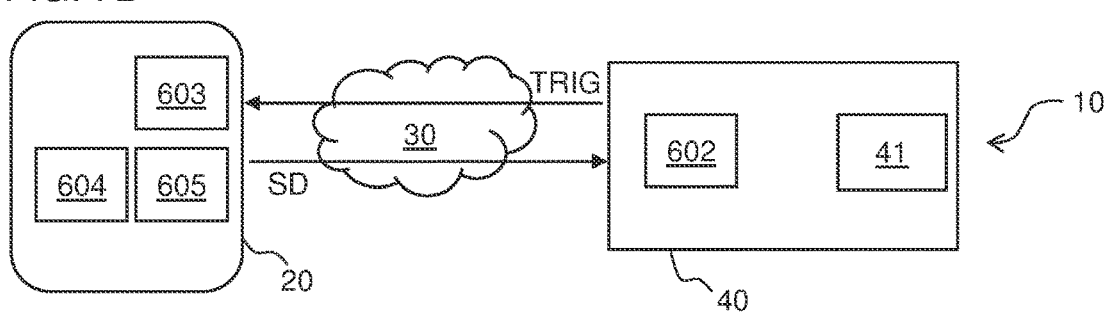

FIGS. 7A-7C show three non-limiting examples of how the modules 602-605 may be distributed within the data collection system 10 of FIG. 1.

In FIG. 7A, all modules 602-605 are implemented by the electronic device 20, which is thereby capable of autonomously determining and executing a modified schedule. By the execution of the modified schedule, resulting sensor data SD is transmitted from the electronic device 20 over the network 30 for receipt by the computing resource 40.

In FIG. 7B, all modules 602-605 are implemented by the computing resource 40, which is thereby capable of determining a modified schedule and configuring the electronic device 20 accordingly, by transmitting corresponding control data (CTRL) to the electronic device 20. The control data may indicate a modified schedule to be used among a predefined set of modified schedules, or one or more control parameters of the modified schedule to be used, such as number of samples per measurement period, duration M1, duration M2, periodicity of measurement periods, periodicity of transmission periods, etc. The control data may also indicate when the modified schedule should be executed, for example when to start or end the execution, duration of the execution, etc. As understood from the foregoing, the operation of one or more modules may be based on sensor data from the electronic device 20, for example the operation of module 602 (cf. step 402). Such sensor data SD may be transmitted by the electronic device 20 when operating according to the default schedule. The electronic device 20 may also be configured to transmit other data to the computing resource 40, for example data indicative of the amount of energy in the power source 22 ("energy level", EL). As understood from the foregoing, the energy level may be used by module 603 (cf. 403). One advantage of the data collection system in FIG. 7B is that the computing resource 40 may have access to richer data than the electronic device 20. The richer data may be used to improve performance. For example, the richer data may include information about traffic situations, weather, weather forecasts, topography, geographic maps, information about the transportation route, locations along the transportation route, and locations of charging devices 22C (cf. FIG. 5A), as well as historical and/or statistical data about missions performed by the electronic device 20 and/or other electronic devices of the data collection system 10. The richer data may also include output data that is generated by analysis module 41 based on the sensor data, for example the confidence of analysis. Another advantage is that the computing resource 40 may have more computation capabilities than the electronic device 20 and may not be power limited.

In FIG. 7C, module 602 is implemented by the computing resource 40, and modules 603-605 are implemented by the electronic device 20. Thereby, the computing resource 40 is operable to detect one or more triggering events, according to step 402, for example based on sensor data SD that is received from the electronic device 20, for example when it operates according to the default schedule. Upon detection of a triggering event, the computing resource 40 transmits a triggering signal (TRIG) to the electronic device 20, thereby causing modules 603-605 to perform steps 403-405.

Figure 8A:
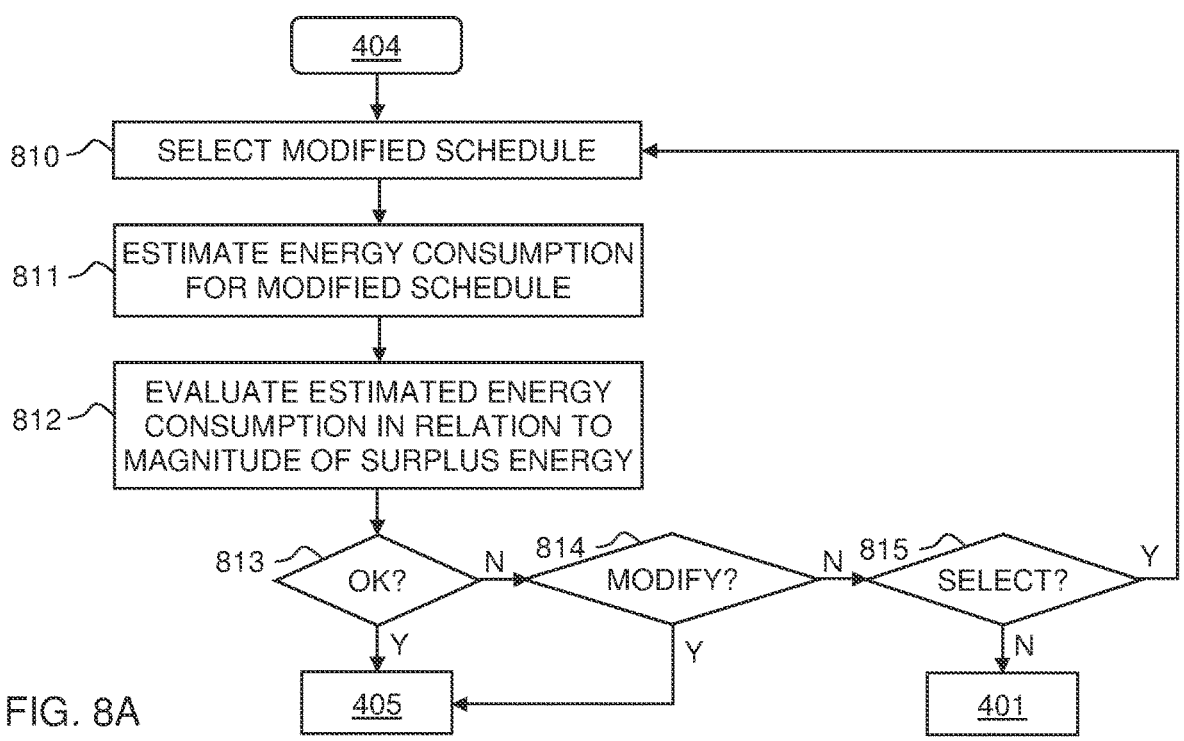
FIGS. 8A-8C are flow charts of example methods, procedures and functions for use in controlling an electronic device.

FIG. 8A is a flow chart of an example procedure corresponding to step 404 in accordance with an embodiment. The example procedure presumes access to a plurality of predefined modified schedules that differ by at least one control parameter and that all result in an increased sampling compared to a default scheme. The definition of the respective modified schedule may be stored in a memory. Step 810 selects one of the modified schedules. As noted above, the modified schedule may also be conditioned upon the type of triggering event detected by step 402 (FIG. 4). Thus, step 810 may be conditioned to select among a specific subset of modified schedules. Step 811 estimates the energy consumption by the electronic device if operated in accordance with the selected modified schedule during the evaluation period, for example as a function of a predefined or previously measured value of the specific energy consumption for the selected modified schedule. Step 812 evaluates the estimated energy consumption from step 811 in relation to the magnitude of surplus energy from step 403 (FIG. 4). If a selection criterion is deemed to be fulfilled at step 813, the procedure proceeds to step 405, which configures the electronic device according to the selected modified schedule. The selection criterion may stipulate that the magnitude of surplus energy should exceed the estimated energy consumption, optionally by the above-mentioned safety margin. Further, the selection criterion may stipulate that the difference between the magnitude of surplus energy and the estimated energy consumption should be less than a threshold value, to force the procedure to select another modified schedule that makes better use of the surplus energy. If the selection criterion is deemed not to be fulfilled at step 813, the procedure proceeds to an optional step 814, which evaluates if the operation of the electronic device in accordance with the selected modified schedule may be shortened or extended to fulfil the selection criterion, for example by changing the selected time point t0 in FIG. 5B. If so, the procedure may proceed to step 405, which configures the electronic device accordingly. If not, the procedure proceeds to step 815, which decides if another modified schedule should be selected. If not, the procedure proceeds to step 401 and the electronic device 20 continues to operate by the default schedule. Otherwise, the procedure proceeds to step 810, which selects (if possible) another modified schedule among the predefined modified schedules, for example to better match the selection criterion.

The embodiment in FIG. 8A may alternatively be implemented without access to a plurality of predefined modified schedules. Instead, step 810 may modify one or more control parameters of a default schedule to create a modified schedule, which is then evaluated by steps 811-815 as described hereinabove. By analogy with the above-described selection, the modification of control parameter(s) may be conditioned upon the type of triggering event detected by step 402 (FIG. 4). If the procedure proceeds to step 810 from step 815, step 810 may modify one or more control parameters in relation to the previously created modified schedule, for example to better match the selection criterion.

Figure 8B:
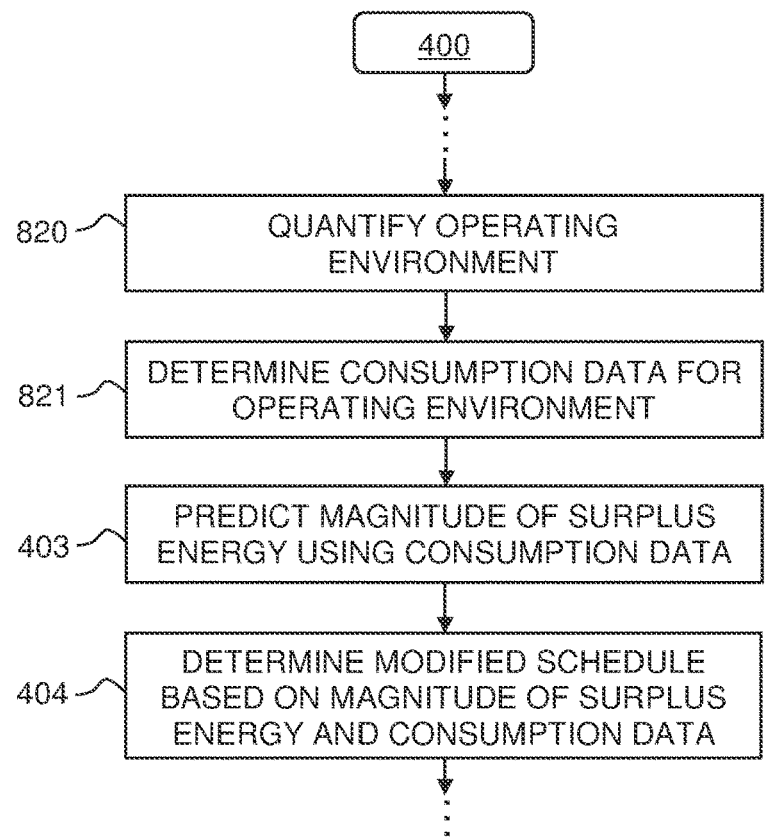

FIG. 8B is a flow chart of the method 400 according to an embodiment which is adapted to account for the operating environment of the electronic device 20 when predicting the magnitude of surplus data (step 403) and/or determining the modified schedule (step 404). This will improve the accuracy of step 403 and/or step 404. To this end, the method 400 comprises steps 820-821 which are performed in advance of steps 403-404.

Step 820 quantifies the operating environment of the electronic device 20 during the evaluation period by estimating one or more status parameters. The status parameter(s) may include any parameter that affects the energy consumption of the electronic device 20 and may be generated based on sensor data or other available input data for the current time step and/or preceding time steps. In some embodiments, the status parameter represents a condition for wireless transmission by the wireless transmitter in the electronic device. Examples of such status parameters include the mean RSSI (received signal strength indication), SNR, SINR (signal-to-interference-plus-noise), error rate, or any corresponding or equivalent parameter. This status parameter may be calculated by the communication arrangement 24 (FIG. 2) or a processor in the electronic device 20. In some embodiments, the status parameter represents the ambient temperature of the electronic device 20, which may be measured by a temperature sensor associated with the electronic device 20. In some embodiments, the status parameter represents the computational load of the electronic device 20. For example, the status parameter may indicate execution of one or more tasks other than tasks associated with the generation and transmission of sensor data, for example by including an indicator of the respective task being executed.

Step 821 determines consumption data as a function of the status parameter(s) from step 820. The consumption data represents energy consumption during operation of the electronic device 20 in accordance with the default schedule and/or the modified schedule. Step 821 may determine the consumption data by calculations, for example by use of a predefined algorithm, or a machine learning-based algorithm. Alternatively, step 821 may retrieve the consumption data from a memory, for example a database that associates different values of the status parameter(s) with different energy consumption values, for example given as specific energy consumption.

In some embodiments, as shown in FIG. 8B, step 403 predicts the magnitude of surplus data by use of the consumption data from step 821. In these embodiments, step 821 has determined the consumption data for the default schedule, since the prediction by step 403 assumes that the electronic device is operated in accordance with the default schedule during the evaluation period. It is realized that the use of consumption data from step 821 may improve accuracy of step 403.

In some embodiments, as also shown in FIG. 8B, step 404 determines the modified schedule by use of the consumption data from step 821. In these embodiments, step 821 has determined the consumption data for the modified schedule, so that step 404 can ensure that the magnitude of surplus energy from step 403 is sufficient to execute the modified schedule. It is realized that the use of consumption data from step 821 may improve accuracy of step 404.

In some embodiments, the consumption data is determined by step 821 to represent the energy consumption separately for the generation ("sampling") of sensor data and the transmission of sensor data. These embodiments are based on the insight that a status parameter may have different impact on the energy consumption for generating the sensor data compared to transmitting the sensor data. It is realized that by having access to separate energy consumption values for sampling and transmission, the accuracy of step 403 and step 404, respectively, may be improved.

In a variant of the method 400 in FIG. 8B, step 820 is omitted and step 821 determines the consumption data without explicitly quantifying the operating environment of the electronic device 20 (denoted "independent variant" below). In such an independent variant, the consumption data may be determined by measuring the energy consumption during execution of the default scheme, for example by measuring the energy decrease in the power source 22. This consumption data may then be used by step 403. The consumption data may also be adapted, for example by predefined correction factors, to the modified schedule and used by step 404. Alternatively, the method 400 configures the electronic device 20 to operate in accordance with different modified schedules, while measuring the specific energy consumption for the respective modified schedule, until a selection criterion is fulfilled (cf. step 813 in FIG. 8A).

Figure 8C:
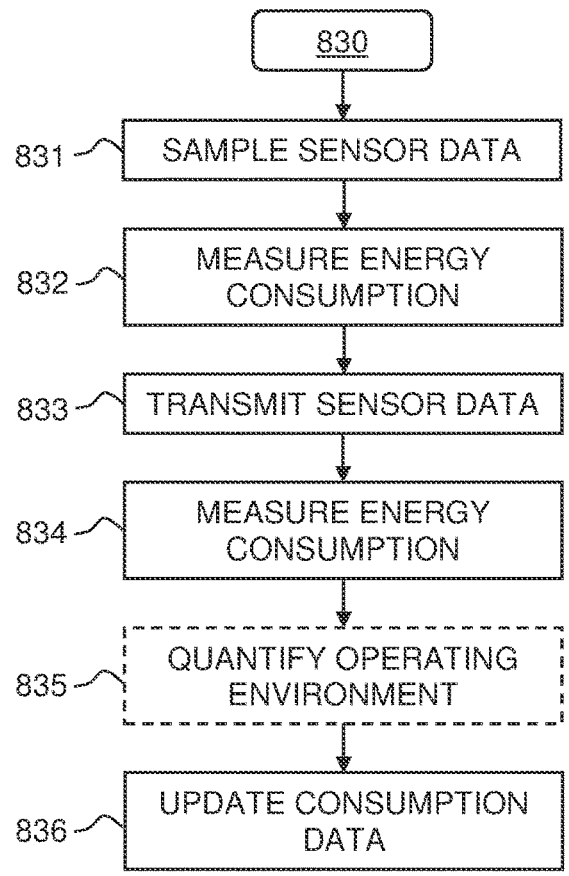

FIG. 8C is a flow chart of an example procedure 830 that may be included in the method 400 to generate the above-mentioned consumption data. The procedure may be repeatedly or intermittently performed while the electronic device is operated in accordance with a current schedule, which may be a default schedule or a modified schedule. In step 831, the electronic device 20 is operated to generate ("sample") sensor data in accordance with the current schedule. Step 832 measures the energy consumption during at least part of step 831, for example the specific energy consumption. In step 833, the electronic device 20 is operated to transmit sensor data in accordance with the current schedule. Step 834 measures the energy consumption during at least part of step 833, by analogy with step 832. Step 835 quantifies the operation environment by estimating one or more status parameters, by analogy with step 820 (FIG. 8B). Step 836 may then update the consumption data stored in the above-mentioned database by including the measured values of the energy consumption from steps 832, 834 in association with the value(s) of the estimated status parameter(s) from step 835. The measured values from steps 832, 834 may be included as a joint value or as separate values for sampling and transmission. As new measured values are generated for the same operational environment, these values may be added to the database, for example by overwriting or averaging. It is realized that the database will be gradually populated for different operating environments, and different default or modified schedules (if used), during operation of the electronic device 20. Also, the updating may improve the accuracy of the consumption data in the database over time.

As indicated by dashed lines in FIG. 8C, step 835 may be omitted and the procedure 830 may be used for measuring the consumption data in the above-mentioned independent variant. Step 836 may set the consumption data to the measured values from steps 832, 834, to a joint value calculated based on the measured values, or generate corresponding consumption data by averaging the measured values from steps 832, 834 over several repetitions of the procedure 830.

Figure 9:
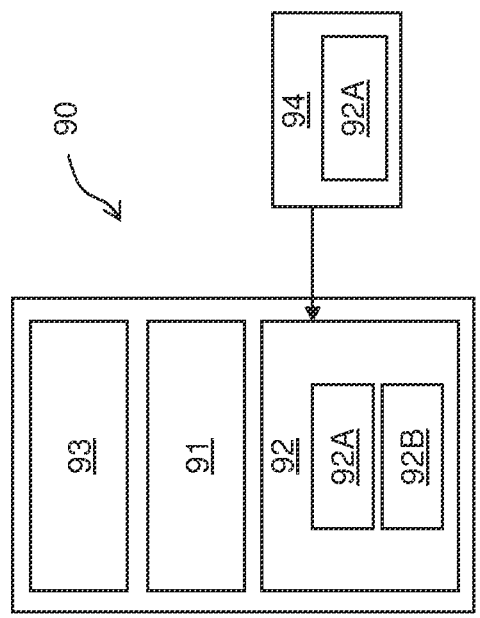
FIG. 9 is a block diagram of a machine that may implement any one of the methods, procedures and functions described herein.

The structures and methods disclosed herein may be implemented by hardware or a combination of software and hardware. In some embodiments, the hardware comprises one or more software-controlled processors. FIG. 9 schematically depicts a software-controlled apparatus 90, which may represent the electronic device 20 or the computing resource 40. The apparatus 90 comprises a processing system 91, computer memory 92, and a wireless communication arrangement 93, which is configured in correspondence with the arrangement 24 as described for FIG. 2. The processing system 91 may include one or more of a CPU ("Central Processing Unit"), a DSP ("Digital Signal Processor"), a GPU ("Graphics Processing Unit"), a microprocessor, a microcontroller, an ASIC ("Application-Specific Integrated Circuit"), a combination of discrete analog and/or digital components, or some other programmable logical device, such as an FPGA ("Field Programmable Gate Array"). A control program 92A comprising computer instructions is stored in the memory 92 and executed by the processing system 91 to implement logic that performs any of the methods, procedures, functions or steps described in the foregoing. The control program 92A may be supplied to the apparatus on a computer-readable medium 94, which may be a tangible (non-transitory) product (e.g. magnetic medium, optical disk, read-only memory, flash memory, etc.) or a propagating signal. As indicated in FIG. 9, the memory 92 may also store control data 92B for use by the processing system 91, such as one or more default schedules, one or more modified schedules, consumption data, etc.

While the subject of the present disclosure has been described in connection with what is presently considered to be the most practical embodiments, it is to be understood that the subject of the present disclosure is not to be limited to the disclosed embodiments, but on the contrary, is intended to cover various modifications and equivalent arrangements included within the spirit and the scope of the appended claims.

Further, while operations are depicted in the drawings in a particular order, this should not be understood as requiring that such operations be performed in the particular order shown or in sequential order, or that all illustrated operations be performed, to achieve desirable results.

In the following, clauses are recited to summarize some aspects and embodiments as disclosed in the foregoing.

C1. A method of controlling an electronic device (20) comprising a power source (22) and a wireless transmitter (24), said method comprising:

predicting (403) a magnitude of surplus energy in the power source (22) under the assumption that the electronic device (20) is operated in accordance with a default schedule over a time period, wherein the default schedule defines sampling of sensor data from at least one sensor (21A-21N) and transmission of the sensor data by use of the wireless transmitter (24), determining (404), based on the magnitude of surplus energy, a modified schedule that results in sampling of an increased amount of sensor data per unit time compared to the default schedule, and configuring (405) the electronic device (20) to operate in accordance with the modified schedule for at least part of the time period.

C2. The method of C1, wherein the modified schedule is determined to result in data samples of sensor data in accordance with the default schedule, and additional data samples of sensor data.

C3. The method of C1 or C2, wherein said predicting (403) a magnitude of surplus energy comprises: determining an estimated energy consumption for the time period, determining an amount of energy in the power source (22) at a selected time point in the time period, and evaluating the estimated energy consumption in relation to the amount of energy.

C4. The method of C3, wherein the estimated energy consumption is based on a measured energy decrease in the power source while the electronic device is operated in accordance with the default schedule.

C5. The method of any preceding clause, wherein said predicting (403) a magnitude of surplus energy is performed while the electronic device (20) is operated (401) in accordance with the default schedule.

C6. The method of any preceding clause, wherein said predicting (403) a magnitude of surplus energy is triggered by detection (402) of at least one event based at least partly on said sensor data.

C7. The method of C6, further comprising: evaluating the sensor data for said detection (402) of at least one event.

C8. The method of C6 or C7, wherein said detection (402) of at least one event comprises: a detection that the electronic device (20) is within a predefined spatial or temporal distance from a target location (P4), a detection of unreliable output from a processing of the sensor data, or a detection or prediction of an activation of an on-board device (22B) for charging the power source (22).

C9. The method of any preceding clause, wherein the time period ends when the electronic device (20) arrives at a predefined location (P4).

C10. The method of C9, wherein the predefined location (P4) comprises or is associated with an external device (22C) for recharging the power source (22).

C11. The method of any preceding clause, further comprising: determining (821) consumption data that represents energy consumption during operation of the electronic device (20) in accordance with the default schedule or the modified schedule, and performing at least one of said predicting (403) a magnitude of surplus energy and said determining (404) a modified schedule based on the consumption data.

C12. The method of C11, wherein the consumption data represents the energy consumption separately for the sampling of the sensor data and the transmission of the sensor data.

C13. The method of C11 or C12, wherein said determining (821) comprises retrieving the consumption data from a memory device (92), which stores consumption data for different operating environments of the electronic device (20).

C14. The method of C13, wherein said different operating environments differ by one or more of: a condition for wireless transmission by the wireless transmitter (24), an ambient temperature of the electronic device (20), or one or more tasks executed by the electronic device (20) other than tasks associated with the data sampling and the data transmission.

C15. The method of C13 or C14, further comprising: estimating (820) at least one status parameter representing the operating environment of the electronic device (20) during the time period, wherein said determining (821) is performed as a function of the at least one status parameter.

C16. The method of any one of C11-C15, further comprising: measuring (832, 834) and updating (836) the consumption data during operation of the electronic device (20) in accordance with the default schedule and the modified schedule, respectively.

C17. The method of any preceding clause, wherein the modified schedule is determined to retain a portion of the surplus energy in the power source (22) at the end of the time period.

C18. The method of any preceding clause, wherein each of the default schedule and the modified schedule defines a duration (M1) of measurement periods (301) during which the sensor data is sampled, a number of data samples (302) obtained during a respective measurement period (301), and a duration (M2) of a measurement interval without sampling of sensor data between the measurement periods (301).

C19. The method of C18, wherein each of the default schedule and the modified schedule further defines a timing of the transmission (303) of the sensor data.

C20. The method of any preceding clause, wherein the electronic device (20) is mobile, and said sensor data comprises positions of the electronic device (20).

C21. The method of C20, wherein the electronic device (20) is a tracker for goods.

C22. The method of C20, wherein the electronic device (20) is configured to be carried or worn by an individual.

C23. A computer-readable medium comprising instructions which, when installed on a processor (91) in an electronic device (20) or in a computing resource (40) which is configured to communicate with the electronic device (20), causes the processor (91) to perform the method of any preceding clause.

C24. A system for controlling an electronic device (20) comprising a power source (22) and a wireless transmitter (24), said system comprising:
   a first module (603) for predicting a magnitude of surplus energy in the power source (22) under the assumption that the electronic device (20) is operated in accordance with a default schedule over a time period, wherein the default schedule defines sampling of sensor data from at least one sensor (21A-21N) and transmission of the sensor data by use of the wireless transmitter (24),
   a second module (604) for determining, based on the magnitude of surplus energy, a modified schedule that results in sampling of an increased amount of sensor data per unit time compared to the default schedule, and
   a third module (605) for configuring the electronic device (20) to operate in accordance with the modified schedule for at least part of the time period.

C25. The system of C24, wherein said first, second and third modules (603-605) are arranged in a computing resource (40) which is configured to communicate with the electronic device (20).

C26. The system of C24, wherein said first, second and third modules (603-605) are arranged in the electronic device (20).

The invention claimed is:

1. A method of controlling an electronic device comprising a power source and a wireless transmitter, said method comprising:
   predicting a magnitude of surplus energy in the power source over a time period under assumption that the electronic device is operated in accordance with a default schedule over the time period, wherein the default schedule defines sampling of sensor data from at least one sensor of the electronic device and transmission of the sensor data by the wireless transmitter;

determining, based on the magnitude of surplus energy over the time period, a modified schedule that results in sampling of an increased amount of sensor data per unit time compared to the default schedule; and configuring the electronic device to operate in accordance with the modified schedule for at least part of the time period, wherein the predicting a magnitude of surplus energy is triggered by a detection by the at least one sensor of the electronic device that the electronic device is within a predefined spatial or temporal distance from a target location.

2. The method of claim 1, wherein the modified schedule is determined to result in data samples of sensor data in accordance with the default schedule, and additional data samples of sensor data.

3. The method of claim 1, wherein said predicting a magnitude of surplus energy comprises: determining an estimated energy consumption for the time period, determining an amount of energy in the power source at a selected time point in the time period, and evaluating the estimated energy consumption in relation to the amount of energy.

4. The method of claim 3, wherein the estimated energy consumption is based on a measured energy decrease in the power source while the electronic device is operated in accordance with the default schedule.

5. The method of claim 1, wherein said predicting a magnitude of surplus energy is performed while the electronic device is operated in accordance with the default schedule.

6. The method of claim 1, wherein said predicting a magnitude of surplus energy is triggered by detection of at least one event based at least partly on said sensor data.

7. The method of claim 6, wherein said detection of at least one event comprises: a detection of unreliable output from a processing of the sensor data, or a detection or prediction of an activation of an on-board device for charging the power source.

8. The method of claim 1, wherein the time period ends when the electronic device arrives at a predefined location.

9. The method of claim 8, wherein the predefined location comprises or is associated with an external device for recharging the power source.

10. The method of claim 1, further comprising: determining consumption data that represents energy consumption during operation of the electronic device in accordance with the default schedule or the modified schedule, and performing at least one of said predicting a magnitude of surplus energy and said determining a modified schedule based on the consumption data.

11. The method of claim 10, wherein the consumption data represents the energy consumption separately for the sampling of the sensor data and the transmission of the sensor data.

12. The method of claim 10, further comprising: estimating at least one status parameter representing an operating environment of the electronic device during the time period, wherein said determining consumption data comprises retrieving, as a function of the at least one status parameter, the consumption data from a memory device, which stores consumption data for different operating environments of the electronic device.

13. The method of claim 12, wherein said different operating environments differ by one or more of: a condition for wireless transmission by the wireless transmitter, an ambient temperature of the electronic device, or one or more tasks executed by the electronic device other than tasks associated with the data sampling and the data transmission.

14. The method of claim 10, further comprising: measuring and updating the consumption data during operation of the electronic device in accordance with the default schedule and the modified schedule, respectively.

15. The method of claim 1, wherein each of the default schedule and the modified schedule defines a duration of measurement periods during which the sensor data is sampled, a number of data samples obtained during a respective measurement period, and a duration of a measurement interval without sampling of sensor data between the measurement periods.

16. The method of claim 15, wherein each of the default schedule and the modified schedule further defines a timing of the transmission of the sensor data.

17. The method of claim 1, wherein the electronic device is mobile, and said sensor data comprises positions of the electronic device.

18. The method of claim 17, wherein the electronic device is a tracker for goods or configured to be carried or worn by an individual.

19. A non-transitory computer-readable medium comprising instructions which, when installed on a processor in an electronic device or in a computing resource which is configured to communicate with the electronic device, causes the processor to perform the method of claim 1.

20. A system for controlling an electronic device comprising a power source and a wireless transmitter, said system comprising:

a first processor circuit configured to predict a magnitude of surplus energy in the power source over a time period under assumption that the electronic device is operated in accordance with a default schedule over the time period, wherein the default schedule defines sampling of sensor data from at least one sensor of the electronic device and transmission of the sensor data by the wireless transmitter, a second processor circuit configured to determine, based on the magnitude of surplus energy over the time period, a modified schedule that results in sampling of an increased amount of sensor data per unit time compared to the default schedule, and a third processor circuit for configuring the electronic device to operate in accordance with the modified schedule for at least part of the time period, wherein the predicting a magnitude of surplus energy is triggered by a detection by the at least one sensor of the electronic device that the electronic device is within a predefined spatial or temporal distance from a target location.

* * * * *